April 14, 1970  C. GRUERE  3,506,310
BORING MACHINE
Filed Dec. 1, 1967  3 Sheets-Sheet 1
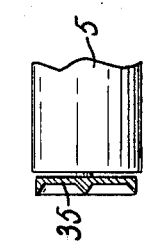
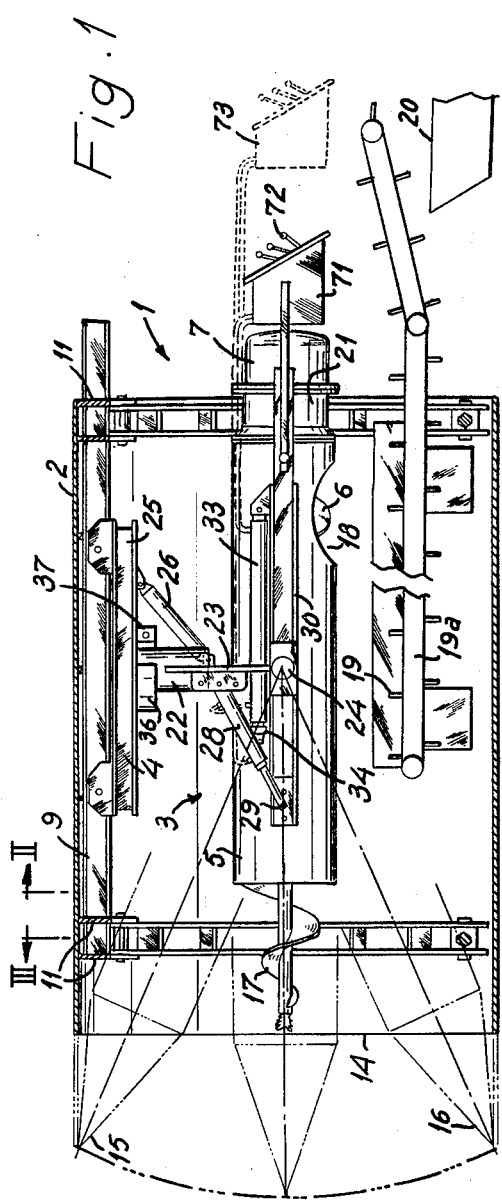
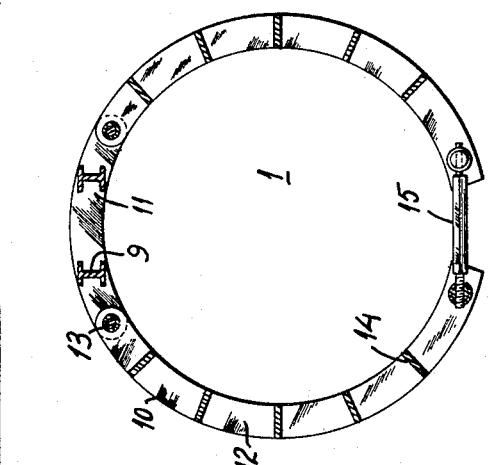
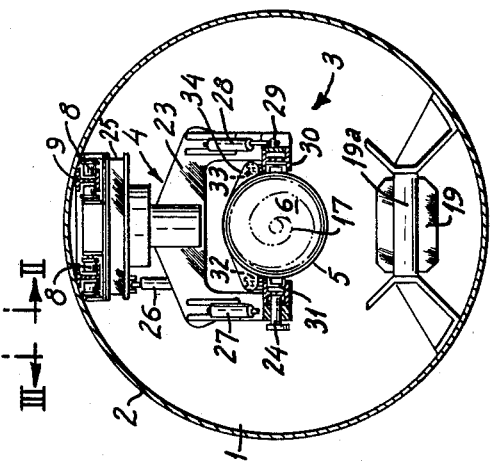
INVENTOR.
CHARLES GRUERE
BY
Andrus & Starke
Attorneys April 14, 1970     C. GRUERE     3,506,310
BORING MACHINE Filed Dec. 1, 1967     3 Sheets-Sheet 2

INVENTOR.
CHARLES GRUERE
BY
Attorneys

April 14, 1970 C. GRUERE 3,506,310
BORING MACHINE

Filed Dec. 1, 1967 3 Sheets-Sheet 3

INVENTOR.
CHARLES GRUERE
BY
Andrus & Starke
Attorneys

United States Patent Office 3,506,310
Patented Apr. 14, 1970

3,506,310
BORING MACHINE
Charles Gruere, 21 Rue de Teheran,
Paris, France
Filed Dec. 1, 1967, Ser. No. 687,191
Claims priority, application France, Dec. 2, 1966,
85,927
Int. Cl. E21c 1/02, 5/00, 11/00
U.S. Cl. 299—56          11 Claims

ABSTRACT OF THE DISCLOSURE

A boring machine includes a motor driven helical drill rotatably mounted within and extending outwardly of a tube. The trailing end of the tube includes an opening through which the spoil drops. The tube and drill are supported in trolley framework which is mounted within shuttering for arbored part of the opening or bore. The tube support includes rollers secured to the tube and supported on rails for movement longitudinally of the bore. A vertical shaft is rotatably secured to the rollers for controlled rotation on a vertical axis and the lower end includes a stirrup. Pivot members are secured on the outer ends of the stirrup and connected to rails on the opposite sides of the tube and which support the tube for longitudinal movement. A plurality of jacks are proivded and interconnected to position the tube and drill with a horizontal swinging movement, vertical pivoting movement and longitudinal sliding movement.

For rectangular bores, a drill and tube are supported on a framework which rides on a pair of rails on the floor of the horizontal bore or gallery. The framework and tube and drill are supported and positioned in the same manner as in the previously described machine and in addition includes a sliding vertical support for translatory motion of the drill and tube.

---

This invention relates to machines for making large-sized bores such as tunnels or galleries.

Existing drilling equipment usually comprises drill-bits, the purpose of which is to pierce solid rock; the bore-holes thus made then receive explosive charges with which the rock is blasted.

Machines are also known which both produce a bore and remove spoil by means of a multiple tool bit carried by a helical surface or by coaxial cylindrical surfaces; the spoil removal may, for example, be effected by means such as a screw conveyor coupled with the tool bit carrier.

These machines have the drawback of being cumbersome and of requiring special spoil removal means juxtaposed with the drilling means proper. Similarly, when the drilling bit is a screw, the spoil removal which it also performs by reason of its shape is not sufficient to carry the spoil as far as the rear of the machine. Furthermore, these drills do not by themselves produce large-sized bores such as galleries, and their bits cannot be oriented at will.

It is an object of the present invention to provide a machine having an orientable drill requiring little space and which performs simultaneous drilling and spoil removal, and which is suitable for making large-sized bores, particularly horizontal bores.

According to a particularly novel aspect of the invention a machine suitable for making large-sized bores comprises a movable framework supporting a tube which surrounds at least part of a drilling and spoil removal device which is coaxial with the tube and which comprises at its forward portion a drill-head and rearwardly thereof a screw conveyor, the tube having an orifice for discharging spoil, means for rotating the said device in the tube, and means for swivelling the assembly comprising the tube and the drilling and spoil removal device in relation to the framework.

The spoil cut away by the drill head is carried away within the tube by the screw conveyor, being discharged through the orifice for further removal, for instance on a belt conveyor.

The swivelling action of the drill and tube allows the drill head to be moved about to drill out a large-size bore, and provides for removal of spoil in all positions of the drill head. Preferably the drilling and spoil removal device is movable longitudinally in relation to the tube.

The drill head may be flat or frusto-conical.

In order to make a virtually circular bore, the swivelling axes of the tube intersect or lie near to the central longitudinal axis of the bore; thus, the drill can reach every point at the front of the bore by simply swivelling the assembly. In order to make a rectangular bore, additional means are provided for lateral displacement of the assembly.

The elements which produce the swivelling and translatory movement of the tube are advantageously jacks; these elements may be operated by remote control.

The invention may be performad in various ways, and two specific embodiments will now be described by way of example with reference to the accompanying drawings, in which:

FIGURE 1 is a longitudinal section through a horizontal cylindrical gallery drilled by a suspended tube machine embodying the invention;

FIGURE 2 is a cross-section taken along the line II—II of FIGURE 1;

FIGURE 3 is a cross-section taken along the line III—III of an assembly detail of the machine shown in FIGURE 1;

FIGURE 4 shows a flat drill head;

Figure 5:
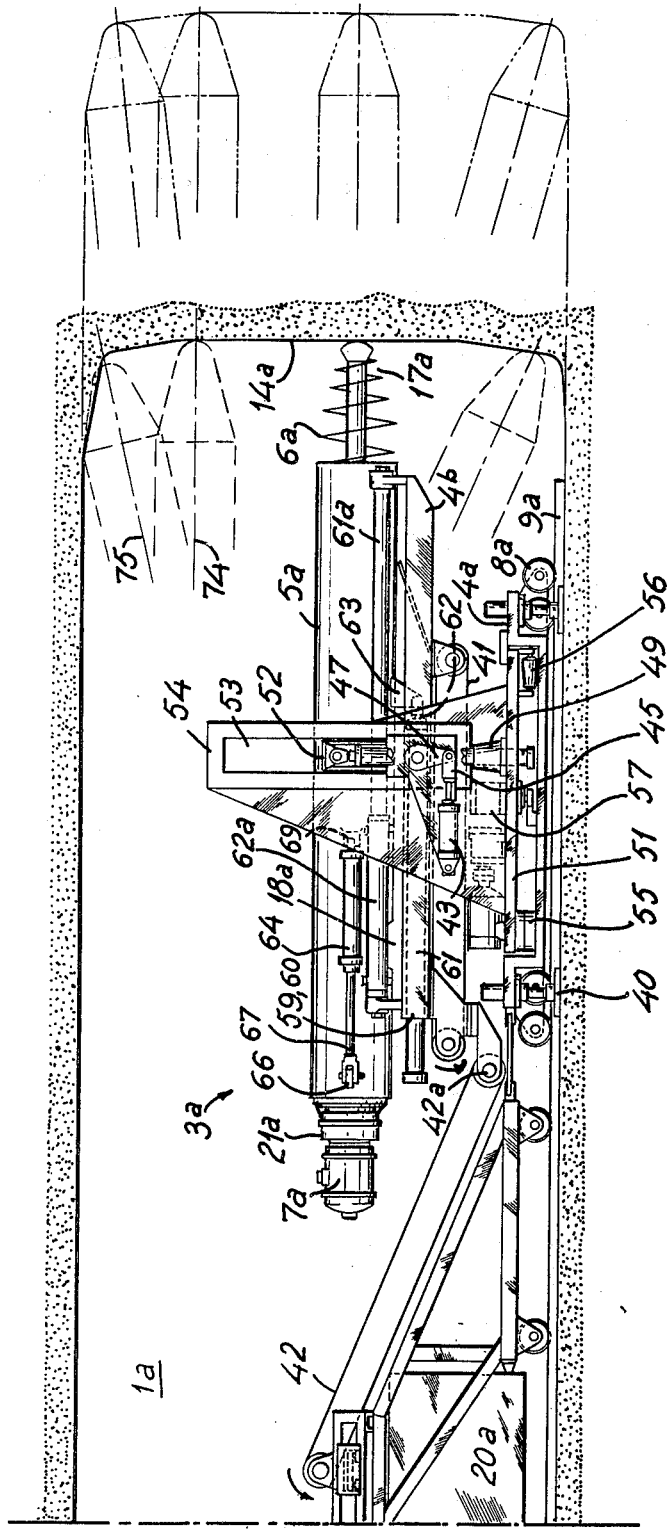
FIGURE 5 is a longitudinal section through a horizontal gallery of rectangular section drilled by a supported tube machine embodying the invention.

Referring to the drawings, FIGURES 1 and 2 show a horizontal gallery 1 of circular cross-section, of which the part already bored is encircled by shuttering 2 of steel, concrete or other suitable material.

The machine 3 embodying the invention comprises a framework 4, a tube 5 suspended from this framework and at least partly enveloping a drilling and spoil removal device 6 which is driven by a motor 7. The framework 4 is suspended by means of rollers 8 shown in FIGURE 2, which rollers run on two longitudinal rails 9 which support and stabilize the machine 3 and allow it to be displaced horizontally along the bore. An advantage of this arrangement is that it frees the lower part of the gallery 1 so that a belt conveyor 19a may be installed therein.

The rails 9 transmit the forces to which they are subjected due to the drilling and to the weight of the equipment they carry, to supports 10 (FIGURE 3) disposed at intervals against the shuttering 2. Each of the supports 10 comprises two upper arcuate parts 11; two pairs of adjacent arcuate parts 12 hinged at 13 to each end of the parts 11; and webs 14 joining the two adjacent parts 12. At the bottom the parts 12 are connected by an expansible link 15 which makes it possible for the support 10 to be applied from within the bore and secured firmly against the shuttering 2. The shuttering thus takes the stresses transmitted by the framework 4, the rails 9 and the supports 10.

When the assembly comprising the tube and the drilling and spoil removal device is in its central position as shown in full lines in FIGURES 1 and 2, its longitudinal axis coincides with the central longitudinal axis of the gallery. By swivelling the assembly the drill head can be caused to sweep over the whole drilling front 14 between the extreme upper and lower positions 15, 16 indicated by chain lines, in FIGURE 1, and also laterally.

In this embodiment, the drilling and spoil removing device comprises a helical drill 6, in which the front part 17, close to the drilling front, constitutes the drill head, and of which the rear part is a screw conveyor which moves the spoil rearwardly within the tube; the spoil simply falls by gravity through an orifice 18 in the tube 5 on to the conveyor belt 19a having projection 19, which conveys the spoil into a skip 20.

A driving motor 7 drives the drill 6 through reduction gearing 21 and a flexible coupling (not shown).

The framework 4 comprises a vertical tubular shaft 22 adapted to swivel about its vertical axis, and a stirrup member 23 integral with the shaft and which carries the tube on pivots 24 which enable the tube to swivel also about a horizontal axis.

A double-acting hydraulic jack 26, articulated at its upper end to a non-rotating member 25 of the framework 4 and at its other end to the stirrup member 23 at a point spaced from the axis of the shaft 22, imparts horizontal sweeping movements to the tube-drill assembly.

Two double-acting jacks 27, 28 produce vertical sweeping movements; these jacks are disposed symmetrically in relation to the vertical plane containing the central longitudinal axis of the gallery and are articulated at their upper ends to the stirrup member 23 and at their lower ends to brackets 29 mounted on rails 30. These rails are situated on each side of the tube and are connected to the stirrup member 23 by means of pivots 24. The tube is adapted to slide along these rails by means of lateral guide elements 31.

Two double-acting jacks 32, 33 which are disposed symmetrically in relation to the vertical plane containing the longitudinal axis of the gallery, each connected at one end to one of the rails 30 and at the other end to a lug 34 fixed to the tube. These jacks provide for longitudinal movement of the tube-drill assembly in relation to the framework. Also (a feature which is not shown) it is possible to displace the drill longitudinally within the tube, by means of jacks for example.

The drill head 17 as shown in FIGURE 1 is frustoconical, but instead it could, as shown in FIGURE 4, be flat 35 and have steel, tungsten carbide or similar cutters; in practice, a frustoconical head 17 is preferred for drilling the peripheral zones of the circular boring front; and the same head 17 or the flat head 35 for drilling the central part of the front.

The assembly can lock against swivelling movement about the vertical axis by application on the shaft 22 of a brake 36 operated by a jack 37.

Figure 6:
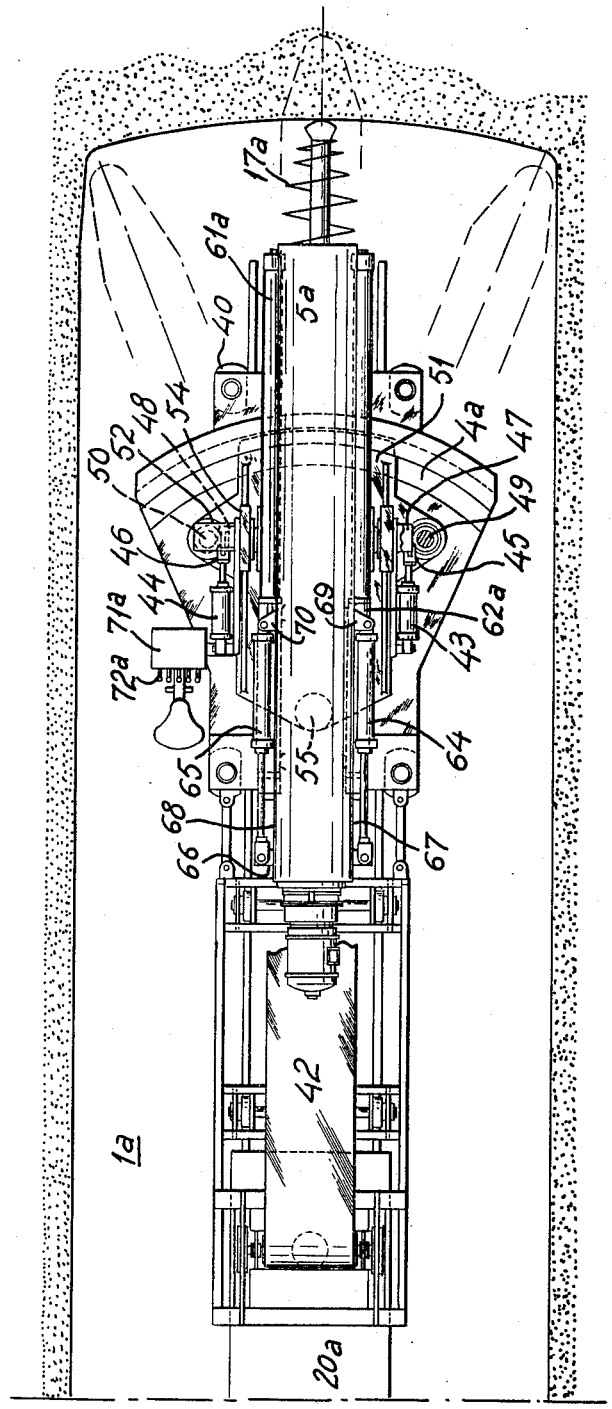
FIGURE 6 is a plan view of the machine shown in FIGURE 5.

The embodiment of the invention illustrated in FIGURES 5 and 6 is likewise intended for drilling a horizontal gallery, but of rectangular cross-section. The machine 3a advances as drilling proceeds, along the floor of the gallery 1a. It comprises a framework 4a and, as in the previous embodiment, a tube 5a carried by the framework and partly enclosing a drilling and spoil removing device 6a. This device is driven by a motor 7a through reduction gearing 21a and a flexible coupling (not shown).

The framework 4a is supported by means of rollers 8a on rails 9a. Shoes 40 associated with jacks ensure rigidity of the framework during drilling, by bearing down on the floor of the gallery. The forward part 17a of the device 6a carries the drill head which cuts away the spoil from the drilling front 14a. The tube, which is advanced close to the front 14a, receives the spoil which is moved towards the rear of the tube under the effect of the rotation of the screw conveyor portion of the device 6a. The spoil falls through the orifice 18a of the tube 5a onto a first belt conveyor 41 which is sufficiently long to receive the spoil from the orifice 18a whatever the position of the tube. The spoil drops from the conveyor 41 to a second belt conveyor 42 which is mounted on rollers behind the machine; the conveyor 42 tips the spoil into a skip 20a. The first conveyor 41 advantageously is caused to follow the sweeping movements of a movable part 4b of the framework 4a, while the second conveyor 42 is articulated at 42a to adapt itself to these movements.

The various positions of the tube 5a and of the drill head 17a indicated by broken and chain lines in FIGURES 5 and 6 are achieved by the operation of various jacks described hereinafter; these jacks are grouped in pairs symmetrically in relation to the vertical plane containing the longitudinal axis of the gallery, in order to provide a balanced thrust.

Horizontal jacks 43, 44 swivel the assembly comprising the tube 5a, the drill device 6a and the movable framework 4b in a vertical plane, through connecting rods 45, 46 which are articulated on arms 47, 48 integral with the movable framework 4b.

Vertical jacks 49, 50 contribute to the vertical sweeping performed in part by the jacks 43, 44; for this purpose the jacks 49, 50 raise or lower the whole tube-drill-movable framework assembly vertically. These jacks 49, 50 bear at their lower ends on a turntable 51 in the framework and at their upper ends on a bracket 42 which is fixed to the tube; the bracket slides in vertical slideways 53 in a guide 54 carried by the turntable 51.

In order to obtain horizontal sweeping, the turntable 51 carrying the guide 54 and hence the tube-drill-movable framework assembly swivel about a vertical pivot 55, rolling on rollers 56 on the framework 4a. This swivelling movement is produced by a motor and reduction gearing unit 57 through a rack and pinion mechanism.

Two jacks 59, 60 cause the tube to move axially in relation to the movable part 4b of the framework; to this end, the fixed parts 61 of these jacks are secured to the movable part 4b, and their movable parts 62 are connected to brackets 63 fixed to the tube. The tube is guided longitudinally by sleeves 62a fixed to the tube, which slide on slideways 61a secured to the movable part 4b.

Axial movements of the drill in relation to the tube are effected by means of the jacks 64, 65 each articulated at one end to a cross-bar 66 which is connected to the drill and is capable of being displaced longitudinally in grooves 67, 68 in the sides of the tube, and articulated at the other end to lugs 69, 70 attached to the sides of the tube 5a.

The machine shown in FIGURES 1 to 4 is operated from a control panel 71 having levers 72 which control the flow of pressurized fluid to and from the jacks, which panel is mounted at the rear of the machine to one side thereof. Similarly, in the machine shown in FIGURES 5 and 6 there is a control panel 71a having levers 72a. A dual control, indicated at 73 in FIGURE 1, may advantageously be disposed well to the rear of the drilling machine; the operator can then operate the machine by remote control, e.g. for drilling shallow galleries.

The machine shown in FIGURES 5 and 6 function as follows: the operator, having caused the machine 3a to move forwards as far as the drilling front 14a, secures it to the ground by the 40 of jacks and shoes, then attacks the selected area of the front by operating the horizontal sweep levers, then the vertical sweep levers which operate the jacks 49, 50 and 43, 44. To collect the spoil he applies the tube against the front by using the jacks 59, 60, and can also cause the drill to advance by operating the jacks 64, 65.

The advantage of the vertical jacks 49, 50 is that they make it possible to raise the assembly comprising the tube, drill, and movable part 4b of the framework as far as the extreme horizontal position 74; by actuating the jacks 43, 44, it is then possible to obtain the position 75 and make bores parallel with the roof of the gallery.

Various modifications can of course be made to the embodiments described; in particular, the galleries or other bores drilled by the machine are not necessarily horizontal, the discharge orifice in the tube and the associated conveyor being then modified in an appropriate manner. Also, devices other than jacks can be used for performing the various movements. The rotatable shaft 22 of the framework of the machine shown in FIGURES 1 to 4 could be telescopic to permit further adjustment of the height of the drilling equipment to increase the range of diameters of the bores which the machine will drill.

I claim:

1. A horizontal type boring machine comprising a drill means, a spoil removal means, a common support for said drill means and said spoil removal means and including movable means for horizontal and vertical orienting of said drill means and said spoil removal means in a plurality of positions on said common support for making a plurality of small bores in the forming of large-sized bores, said spoil removal means including a tubular member and a rotating conveyor means mounted therein, said drill means being secured to the forward end of said conveyor means, and means to longitudinally extend and retract said drill means with respect to said common support for purposes of establishing a small-sized bore.

2. A machine according to claim 1 having hydraulic jack means connected to said support means and to said tubular member and drill means to establish said extension and retraction.

3. The boring machine of claim 1 including an outer supporting framework, movable means mounting said common support on said framework for longitudinal forward and reverse movement with respect to said framework.

4. The boring machine of claim 1 wherein said rotating conveyor includes a screw conveyor means, said drill means being secured to the forward end of said screw conveyor means, means for moving of said screw conveyor means longitudinally within said tubular member, said movable means including a first rotatable support permitting movement of said screw conveyor means about a first axis for horizontal swinging movement of the conveyor means and a second rotatable support permitting swinging movement of said rotating conveyor means about a second axis substantially normal to said first axis for vertical swinging movement of the conveyor means.

5. The boring machine of claim 1 wherein said support includes an upper supporting framework extending longitudinally of the bore, said movable means including a first rotatable support movable suspended from said framework for longitudinal positioning within the bore, a second rotatable support connected to the first rotatable support having an axis normal to the first rotatable support, slide means connecting said second rotatable support to said spoil removal means whereby said drill means and spoil removal means are movable relative to said rotatable supports, and hydraulic cylinder means for selectively moving said drill means and spoil removal means.

6. The boring machine of claim 1 wherein said support includes a lower truck understructure having wheel means for moving of said machine along the bore, and said movable means for horizontal and vertical orienting of said drill means and spoil removal means includes a turntable attached to said understructure, a horizontal slide means and a vertical slide means connecting said turntable to said drill means and spoil removal means, said vertical slide means including pivot means to rotate said drill means and spoil removal means about a horizontal axis perpendicular to a bore.

7. A machine according to claim 1 including means for displacing said drill means relatively to the tubular member along the axis of the tubular member.

8. The boring machine of claim 7 having a main framework, one of said rotatable supports being movable connected to the framework for longitudinal movement of the bore and the other of said supports being movable connected to the conveyor means whereby said conveyor means is movable longitudinally of the drill and conveyor means.

9. A boring machine comprising a drill means, a spoil removal means, a common support for said drill means and said spoil removal means and including movable means for horizontal and vertical orienting of said drill means and said spoil removal means in a plurality of positions on said common support for making large-sized bores, a support adapted to be mounted within the bore and having an upper supporting framework, a pivot shaft support rotatably secured to the framework for longitudinal movement thereof, a depending stirrup member secured to said shaft support to define a first rotatable support and having a pivot support member secured to opposite sides of said spoil removal means to define a second rotatable support.

10. The boring machine of claim 9 wherein said support includes at least one longitudinal rail adapted to be secured within the bore, said framework movable along said rail and being a non-rotating part, said shaft carried by said framework so as to be rotatable about an axis perpendicular to the longitudinal axis of the bore to define said first rotatable support.

11. A boring machine comprising a support means having angular orienting members, a tubular member slidably mounted on said orienting members for longitudinal positioning and a drill means rotatably mounted within said tubular member, and positioning means connected to said tubular member for longitudinally moving said tubular member to correspondingly move said drill means.

References Cited

UNITED STATES PATENTS

| 747,868 | 12/1903 | Drake | 299—56 |
| 2,821,374 | 1/1958 | Gardner | 299—56 |
| 2,912,225 | 11/1959 | Kandle | 175—57 |
| 2,919,121 | 12/1959 | Ruth | 299—31 |
| 3,404,920 | 10/1968 | Tabor | 299—33 X |

FOREIGN PATENTS 1,026,554  4/1966  Great Britain.

ERNEST R. PURSER, Primary Examiner

U.S. Cl. X.R.

173—43; 175—62, 381; 299—33, 75